United States Patent Office 3,256,330
Patented June 14, 1966

3,256,330
CYCLOHEXENONE N-ALKYLCARBAMYLOXIMES
John R. Kilsheimer, Westfield, N.J., and David T. Manning, South Charleston, W. Va., assignors to Union Carbide Corporation, a corporation of New York
No Drawing. Filed Sept. 22, 1961, Ser. No. 139,890
5 Claims. (Cl. 260—566)

This invention relates to new chemical compounds and to pesticidal compositions containing them. More particularly, the invention relates to certain carbamyloximes of monocyclic ketones and to pesticidal compositions containing the same.

The novel compounds of this invention comprise substituted and unsubstituted cyclohexanone N-alkylcarbamyloximes and cyclohexenone N-alkylcarbamyloximes. Generally, the compounds of this invention can be represented by the following formula:

(I)
$$Z=N-O-\overset{O}{\overset{\|}{C}}-N\overset{R_1}{\underset{R_2}{<}}$$

wherein $R_1$ is selected from the group consisting of methyl radicals and ethyl radicals; $R_2$ is selected from the group consisting of hydrogen atoms, methyl radicals, and ethyl radicals; and Z is a divalent radical selected from the group consisting of

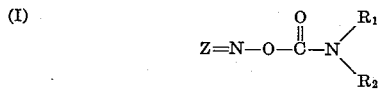

wherein the free valences of ring carbon atoms numbered 2, 3, 4, 5, and 6 are satisfied by members selected from the group consisting of hydrogen atoms, halogen atoms, and organic radicals, but where the molecular weight of said compounds does not exceed 600.

More particularly contemplated are those compounds in which said organic radicals are selected from the group consisting of alkyl radicals, alkenyl radicals, cycloalkyl radicals, aryl radicals, substituted aryl radicals, aralkyl radicals, cyano radicals, carboxy radicals, formyl radicals, acyl radicals, aroyl radicals, acyloxy radicals, aroyloxy radicals, alkoxy radicals, alkylthio radicals, arylthio radicals, alkoxycarbonyl radicals, N-alkylcarbamoyl radicals, N,N-dialkylcarbamoyl radicals, alkoxycarboximidoyl radicals, aryloxycarboximidoyl radicals, alkylthiocarboximidoyl radicals, arythiocarboximidoyl radicals, N-alkylamidino radicals, N,N-dialkylamidino radicals, N-arylamidino radicals, N,N-diarylamidino radicals, thiocyanto radicals, carbonyl radicals, alkoxyimino radicals, nitro radicals, and nitrito radicals.

Compounds particularly preferred because of their outstanding pesticidal activity can be represented by the general formula:

(II)
$$Z'=N-O-\overset{O}{\overset{\|}{C}}-N\overset{R_1}{\underset{R_2}{<}}$$

wherein $R_1$ is selected from the group consisting of methyl radicals and ethyl radicals; $R_2$ is selected from the group consisting of hydrogen atoms, methyl radicals, and ethyl radicals; and Z' is selected from the group consisting of

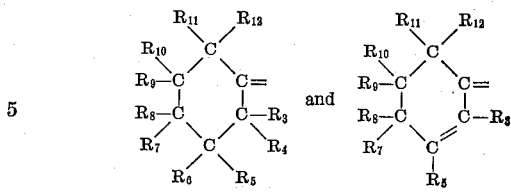

wherein $R_3$, $R_4$, $R_5$, $R_6$, $R_7$, $R_8$, $R_9$, $R_{10}$, $R_{11}$, and $R_{12}$ are selected from the group consisting of hydrogen atoms, chlorine atoms, alkyl radicals having from 1 to about 8 carbon atoms, alkenyl radicals having from 2 to about 8 carbon atoms, cyano radicals, and alkylthio radicals.

The particularly preferred compounds of this invention can be seen to comprise two groups of compounds. The first group can be represented by the general formula:

(III)

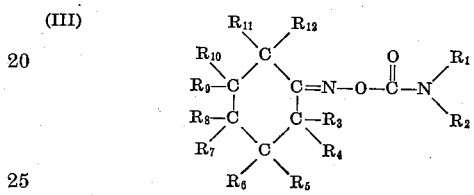

wherein the R radicals are defined as above.

Illustrative of the compounds of the first group are, for example, cyclohexanone N-methylcarbamyloxime, cyclohexanone N-ethylcarbamyloxime, cyclohexanone N, N-dimethylcarbamyloxime, and their chloro-substituted derivatives, such as 2-(or 3- or 4-) chlorocyclohexanone N-methylcarbamyloxime, 2,2-(or 2,3-; 2,4-; 2,5-; 2,6-; 3,3-; 3,4-; 3,5-; or 4,4-;) dichlorocyclohexanone N-methylcarbamyloxime, polychloro derivatives such as 2,2,3-(or 2,3,4-; 3,4,5-; or 2,2,5-; etc.) trichlorocyclohexanone N-methylcarbamyloxime, 2,2,3,3-(or 2,3,4,5-; 2,2,3,4-; etc.) tetrachlorocyclohexanone N-methylcarbamyloxime, 2,3,4, 5,6-(or 2,2,3,3,5; 2,2,3,5,6-; etc.) pentachlorocyclohexanone N-methylcarbamyloxime, and the like. Also illustrative are alkyl-substituted derivatives such as 2-(or 3- or 4-) methyl (or ethyl, propyl, n-butyl, t-butyl, isobutyl) cyclohexanone N-methylcarbamyloxime, 2,2-(or 2,3-; 2,4-; 2,5-; 2,6-; 3,3-; 3,4-; 3,5-; or 4,4-) dimethyl (or diethyl, dipropyl, diisopropyl, di-n-butyl, di-t-butyl, diisobutyl methyl ethyl, methyl propyl, methyl butyl, ethyl propyl, methyl isopropyl, ethyl butyl, propyl butyl) cyclohexanone N-methylcarbamyloxime, polyalkyl-substituted derivatives such as 2,2,3-(or 2,3,4-; 3,4,5-; 3,3,5-; etc.) trimethyl (or triethyl) cyclohexanone N-methylcarbamyloxime, and the like. In addition, illustrative are alkenyl-substituted derivatives such as 2-(or 3- or 4-) vinylcyclohexanone N-methylcarbamyloxime, 2-(or 3- or 4-) isopropenylcyclohexanone, N-methylcarbamyloxime, 2-(or 3- or 4-) propenylcyclohexanone N-methylcarbamyloxime, 2-(or 3- or 4-) allylcyclohexanone N-methylcabamyloxime, 2-(or 3- or 4-) (1-butenyl) cyclohexanone N-methylcarbamyloxime, and the like. Further illustrative are compounds having both chloro and alkyl substituents, chloro and alkenyl substituents, alkyl and alkenyl substituents, or chloro, alkyl, and alkenyl substituents, such as 2-chloro-3-methylcyclohexanone N-methylcarbamyloxime, 2,3-dichloro-5 - isopropylcyclohexanone N-methylcarbamyloxime, 2-chloro-3-isopropenylcyclohexanone N-methylcarbamyloxime, 2-methyl-5-isopropenylcyclohexanone N-methylcarbamyloxime, 2-chloro-3-methyl-5 - isopropenylcyclohexanone N-methylcarbamyloxide, 2 - chloro-5-isopropylcyclohexanone N-methylcarbamyloxime, and the like. Other examples include structures containing the cyano function or cyano and halogen groups in combination such as 2,3 and 4-cyanocyclohexanone N-methylcarbamyloxime, 2-chloro-4-cyanocyclohexanone N-methylcarbamyloxime and 2-chloro-5-cyanocyclohexanone N-methylcarbamyloxime. Also exemplary are compounds containing alkylthio substituents, such as 2-(or 3- or 4-) methylmercaptocyclohexanone N - methylcarbamyloxime 2-chloro-5-methylmercaptocyclohexanone N - methylcarbamyloxime and the like.

The second group of the particularly preferred compounds of this invention can be represented by the general formula

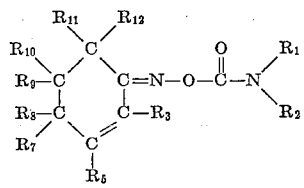

wherein the R radicals are defined as above.

Illustrative of the compounds of the second group are, for example, 2 - cyclohexen - 1 - one N - methylcarbamyloxime, 2 - cyclohexen - 1 - one N - ethylcarbamyloxime, 2 - cyclohexen - 1 - one N,N - dimethylcarbamyloxime, and their chloro-substituted derivatives, such as 2, 3, 4, 5 or 6-chloro-2-cyclohexen-1-one N-methylcarbamyloxime; dichloro-substituted derivatives, such as 2,3-(or 2,4; 2,5; 2,6; 3,4; 3,5; 3,6; 4,4; 4,5; 4,6; 5,5; 5,6; or 6,6;) dichloro-2-cyclohexen-1-one N-methylcarbamyloxime; poly-chloro-substituted derivatives such as 2,3,4-(or 3,4,5; 3,4,4; or 4,5,5; etc.) trichloro-2-cyclohexen-1-one N-methylcarbamyloxime, and the like. Also illustrative are alkyl-substituted derivatives, such as 2-, 3-, 4-, 5-, or 6-methyl (or ethyl, propyl, isopropyl, n-butyl, t-butyl or isobutyl) 2-cyclohexen-1-one N-methylcarbamyloxime; dialkyl-substituted derivatives such as 2,3-(or 2,4; 2,5; 2,6; 3,4; 3,5; 3,6; 4,4; 4,5; 4,6; 5,5; 5,6; 6,6) dimethyl (or diethyl, dipropyl diisopropyl, di-n-butyl, di-t-butyl, diisobutyl, methyl ethyl, methyl propyl, methyl butyl, ethyl propyl, ethyl butyl, propyl butyl) 2-cyclohexen-1-one N-methylcarbamyloxime, polyalkyl-substituted derivatives such as 2,3,4-(or 3,5,5- or 4,4,6-; etc.) trimethyl (or triethyl)-2-cyclohexen-1-one N-methylcarbamyloxime, and the like. In addition, illustrative are alkenyl-substituted derivatives such as 2-(or 3-, 4-, 5- or 6-) vinyl-2-cyclohexen-1-one N-methylcarbamyloxime, 2-(or 3-, 4-, 5- or 6-) isopropenyl-2-cyclohexen-1-one N-methylcarbamyloxime, 2-(or 3-, 4-, 5- or 6-) propenyl-2-cyclohexen-1-one N-methylcarbamyloxime, 2-(or 3-, 4-, 5- or 6-) allyl-2-cyclohexen-1-one N-methylcarbamyloxime, 2-(or 3-, 4-, 5- or 6-) (2-butenyl)-2-cyclohexen-1-one N-methylcarbamyloxime, and the like. Further illustrative are compounds having both chloro and alkyl substituents, chloro and alkenyl substituents, alkyl and alkenyl substituents, or chloro, alkyl, and alkenyl substituents, such as 2-chloro-3-methyl-2-cyclohexen - 1 - one N-methylcarbamyloxime, 2,3 - dichloro-5 - isopropyl - 2 - cyclohexen - 1 - one N - methylcarbamyloxime, 2-chloro-5 - isopropenyl - 2 - cyclohexen - 1 - one N-methylcarbamyloxime, 2-chloro-3-isopropyl-2 - cyclohexen-1-one N-methylcarbamyloxime, 4-methyl - 5 (1-butenyl)-2-cyclohexen-1-one N-methylcarbamyloxime, 2-chloro-3-methyl-5-isopropenyl-2-cyclohexen-1 - one N-methylcarbamyloxime, 2-chloro-3,5,5-trimethyl-2 - cyclohexen-1-one N-methylcarbamyloxime, 2-methyl-5-isopropenyl-2-cyclohexen-1 - one N-methylcarbamyloxime and the like.

The novel monocyclic carbamyloximes of this invention can be prepared from the corresponding monocyclic ketone oximes which, in turn, can be prepared from the corresponding monocyclic ketones. The preparation sequence can be illustrated graphically as follows, where Z is defined as above:

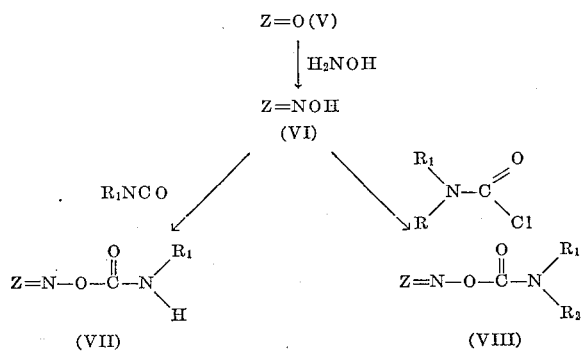

The conversion of the monocyclic ketones (V) to the oxime (VI) is conveniently achieved by the addition of an approximately 100 percent molar excess each of hydroxylamine hydrochloride and sodium acetate, in the form of a water solution, to a solution of the ketone (V) in an inert, water-miscible solvent such as ethanol. The resulting mixture is heated to 50° C. to 100° C. at atmospheric pressure and maintained at this temperature until completion of the reaction which usually requires from about 10 minutes to 3 hours of heating. The oxime product (VI) can usually be recovered from the reaction mixture by cooling the latter and diluting it with a large volume of water until the oxime separates out. The oxime product, if solid, may then be recovered by filtration.

As indicated in the reaction sequence outlined above, the carbamyloximes (VII and VIII) are prepared via two routes. To prepare the carbamyloximes having only one alkyl substituent on the carbamyl nitrogen, i.e. those represented by general Formula VII, the oxime is reacted with a suitably substituted isocyanate, viz. methyl or ethylisocyanate.

The reaction may be effected at temperatures ranging from about 10° C. to about 130° C., and is preferably carried out between room temperature and about 80° C. Generally, temperatures in excess of about 130° C. are to be avoided in view of the temperature sensitivity of the product. The operating pressure may range from about 1 atmosphere to about 10 atmospheres, preferably from about 2 to about 3 atmospheres, and is dependent upon the concentration and vapor pressure of the particular volatile isocyanate used, at the reaction temperature.

The inert organic solvents that can be employed in the reaction are those inert to isocyanates in general, i.e. those not containing radicals such as hydroxy or amino radicals. Illustrative solvents are aliphatic and aromatic hydrocarbons, such as hexane, heptane, octane, benzene, toluene, and the like, and ethers such as diethyl ether, ethyl propyl ether, and the like.

The reaction is preferably carried out in the presence of a tertiary amine or organotin catalyst. The term "organotin catalyst" as used herein is meant to refer to such compounds as dibutyltin diacetate, dibutyltin dichloride, dibutyltin dimethoxide, dibutyltin dilaurate, dibutyltin maleate, dibutyltin di-2-ethylhexenoate, stannous octanoate, stannous oleate, and the like. Generally, amounts of said catalyst from about 0.1 to about 1.0 weight percent of the starting material comprised of isocyanate and the oxime are sufficient.

The mol ratio of isocyante to oxime can range from about 0.25:1 to about 2:1, but preferably an equimolar amount or slight excess of isocyanate is employed to insure that the oxime is completely reacted.

The reaction time may vary from about 5 minutes to about 7 days, but normally, when operating in the preferred temperature range, reaction times of from about one-half hour to about five hours are sufficient for complete reaction.

The carbamyloxime product formed, either a solid or oily liquid, can be recovered from the reaction mixture by means known to the art, e.g. by vacuum-distillation to drive off solvent and excess isocyanate.

To prepare the carbamyloximes having two alkyl substituents on the carbamyl nitrogen, i.e. those represented by general Formula VIII, the oxime is reacted with a suitable dialkyl carbamyl chloride, viz. dimethylcarbamyl chloride or methylethylcarbamyl chloride in the presence of a tertiary amine as hydrogen chloride acceptor under conditions similar to those used for the isocyanate addition.

The following example is illustrative of the preparation of the oxime (VI).

EXAMPLE I

*Preparation of 2-chloro-3,5,5-trimethyl-2-cyclohexen-1-one oxime*

To a solution of 45.2 grams (0.65 mole of hydroxylamine hydrochloride and 54.2 grams (0.66 mole) of anhydrous sodium acetate in 155 milliliters of water was added a solution of 55.9 grams (0.324 mole) of 2-chloro-3,5,5-trimethyl-2-cyclohexen-1-one in 180 milliliters of ethanol. The resulting mixture was heated to reflux (84° C.) with stirring. After about seven minutes of refluxing, white crystals appeared. Refluxing was continued for an additional two-hour period after which the reaction mixture was allowed to cool. The reaction mixture was then diluted with 250 milliliters of water, chilled in ice, and filtered to separate a crystalline precipitate which was washed with water and dried. The dried precipitate product, 2-chloro-3,5,5-trimethyl-2-cyclohexen-1-one oxime, weighed 48 grams, corresponding to a 79 percent yield, and had a melting point of 186° C. (with decomposition). The product was recrystallized from one liter of isopropyl alcohol to give 37 grams of long white needles which had a melting point of 181° C. (with decomposition). The purified product analyzed as follows:

|  | C | H | N | Cl |
|---|---|---|---|---|
| Calculated, percent | 57.60 | 7.52 | 7.46 | 18.89 |
| Found, percent | 57.76 | 7.78 | 7.71 | 19.24 |

The structure was confirmed by infrared spectral analysis.

The following monocyclic oximes were prepared in a similar manner: cyclohexanone oxime, 2-methylcyclohexanone oxime, 3 - methylcyclohexanone oxime, 4 - methylcyclohexanone oxime, 3,5-dimethylcyclohexanone oxime, 3,3,5 - trimethylcyclohexanone oxime, 2 - n - butylcyclohexanone oxime, 2 - isopropyl - 5 - methylcyclohexanone oxime, 2 - chlorocyclohexanone oxime, 2 - chloro - 3-methyl - 2 - cyclohexen - 1 - one oxime, 2 - methyl - 5-isopropenyl - 2 - cyclohexen - 1 - one oxime, 3,5,5 - trimethyl - 2 - cyclohexen - 1 - one oxime, 2 - chloro - 3-isopropyl-2-cyclohexen-1-one oxime.

These monocyclic oximes were converted to the corresponding carbamyloximes in accordance with the general method outlined above. The following examples are illustrative.

EXAMPLE II

*Preparation of cyclohexanone N-methylcarbamyloxime*

37.8 grams (0.33 mole) of cyclohexanone oxime, 20.0 grams (0.35 mole) of methyl isocyanate, 200 milliliters of toluene, and 0.5 gram of dibutyltin diacetate were charged to a pressure bottle. The bottle was stoppered, slowly warmed to 60–70° C., allowed to return to room temperature, and kept at room temperature for about 12 days. The resulting oily mixture was vacuum-distilled to a residue temperature of 92° C. at a pressure of 1 mm. Hg to remove the solvent and excess reactants. The oily product remaining in the kettle weighed 28 grams, corresponding to a 50 percent yield, and analyzed as follows:

Nitrogen, percent
Calculated _____ 16.1
Found _____ 16.5

EXAMPLE III

*Preparation of cyclohexanone N,N-dimethylcarbamyloxime*

40 grams (0.35 mole) of cyclohexanone oxime, 42 grams (0.39 mole) of dimethylcarbamylchloride, 40 grams of pyridine, and 200 milliliters of benzene were charged to a one-liter reaction flask equiped with water condenser, mechanical stirrer, and thermometer. The flask was heated to 80° C. and maintained at this temperature for seven hours, with vigorous stirring. At the end of this time, the entire reaction mixture was washed twice with water and then distilled to remove the solvent and excess reactants. The product remaining in the distillation vessel weighed 34 grams, corresponding to a 53 percent yield, and analyzed as follows:

Nitrogen, percent
Calculated _____ 15.2
Found _____ 15.0

EXAMPLE IV

*Preparation of 2-methyl-5-isopropenyl-2-cyclohexen-1-one N-methylcarbamyloxime*

28 grams (0.17 mole) of 2-methyl-5-isopropenyl-2-cyclohexen-1-one oxime, 12.5 grams (0.22 mole) of methyl isocyanate, 200 milliliters of anhydrous ethyl ether, and 0.05 gram of dibutyltin diacetate were charged to a 500-milliliter reaction flask equipped with a condenser, stirrer, and thermometer. This mixture was stirred for twenty-four hours at room temperature. At the end of this time the reaction mixture was distilled to remove the solvent and any excess methyl isocyanate. The solid product remaining in the distillation vessel was washed with petroleum ether, filtered, and dried. This dried product weighed 31 grams, corresponding to an 82 percent yield, and analyzed as follows:

Nitrogen, percent
Calculated _____ 12.72
Found _____ 12.87

The compounds of the present invention are useful as pesticides. The term "pesticide" as used herein is meant to refer to compounds having activity against at least one member of the group of pests comprised of insects, mites, and nematodes.

Protection against pests is achieved by applying a compound of this invention to the area to be protected. Thus, for example, when used as insecticides, the compounds of this invention can be applied to plants and when used as nematocides, they can be incorporated into the soil. Protective action is achieved by killing the pest involved.

The compounds of this invention can be applied as pesticides in admixture with an inert carrier. This carrier may be a liquid, to form sprays, or a solid, to form dusts. Liquid sprays may be readily prepared by dissolving one of the compounds of this invention in a water-soluble solvent, such as acetone, and mixing the resulting solution into a larger volume of water, thereby throwing the pesticide out of solution in a finely divided, substantially colloidal condition. Liquid sprays may also be prepared by dissolving one of the compounds of this invention in an organic solvent, such as acetone, toluene, xylene, kerosene, or mixtures thereof and dispersing the dissolved pesticide in water by utilizing a suitable surface active dispersing agent such as "Triton X–100," a condensation product of alkylene oxides and organic acids, "Tergitol NPX," a proprietary non-ionic alkyl phenyl polyethylene glycol ether, "Toximul 500" an alkyl aryl sulfonate, and "Hyamine 1622," a quaternary ammonium compound. Generally, the concentration of the dispersing agent is from 0.1% to 10% by weight of the toxicant. The preferred concentration of active pesticide is from about 0.03% to 10% by weight of final spray.

In the preparation of dusts or wettable powders, the active pesticide compound in finely divided form or a solution of the pesticide in a volatile solvent may be mixed into an inert particulate extender, such as clay, talc, chalk, bentonite, fuller's earth and the like. The volatilization of the solvent deposits the pesticide in and on the extender in finely divided form. When formulating a wettable powder, one or more of the above-mentioned dispersing agents may be added and, if desirable, a wetting agent such as "Tergitol 7," a formulation of sodium heptadecyl sulfate may also be included. The combined amount of dispersing and wetting agents may vary broadly, but is usually from about 0.5% to about 15% by weight of the final dust or powder.

In the following series of examples, compounds representative of the present invention were evaluated as insecticides, nematocides, and acaricides. The following compounds were tested.

No. 1—cyclohexanone N-methylcarbamyloxime
No. 2—cyclohexanone N-ethylcarbamyloxime
No. 3—cyclohexanone N,N-dimethylcarbamyloxime
No. 4—2-methylcyclohexanone N-methylcarbamyloxime
No. 5—3-methylcyclohexanone N-methylcarbamyloxime
No. 6—4-methylcyclohexanone N-methylcarbamyloxime
No. 7—3,5-dimethylcyclohexanone N-methylcarbamyloxime
No. 8—3,3,5-trimethylcyclohexanone N-methylcarbamyloxime
No. 9—2-n-butylcyclohexanone N-methylcarbamyloxime
No. 10—2-chlorocyclohexanone N-methylcarbamyloxime
No. 11—2-isopropyl-5-methylcyclohexanone N-methylcarbamyloxime
No. 12—2-chloro-3-methyl-2-cyclohexen-1-one N-methylcarbamyloxime
No. 13—2-methyl-5-isopropenyl-2-cyclohexen-1-one N-methylcarbamyloxime
No. 14—2-chloro-3,5,5-trimethyl-2-cyclohexen-1-one N-methylcarbamyloxime
No. 15—3,5,5-trimethyl-2-cyclohexen-1-one N-methylcarbamyloxime
No. 16—2-chloro-3-isopropyl-2-cyclohexen-1-one N-methylcarbamyloxime Unless otherwise noted, suspensions of compounds 1–16 were prepared by dissolving one gram of compound in 50 milliliters of acetone in which had been dissolved 0.1 gram (10 percent of the weight of compound) of "Triton X-155," an alkylphenoxy polyoxyethanol surfactant, as an emulsifying or dispersing agent. The resulting solution was mixed into 200 milliliters of water to give roughly 250 milliliters of a suspension containing the compound in finely divided form. The thus-prepared stock suspension contained 0.4 percent by weight of compound. The test concentrations employed in the tests described hereinbelow were obtained by diluting the stock suspension with water.

The compounds were evaluated for activity against the following pests: bean aphid, armyworm, Mexican bean beetle, house fly, two-spotted mite, and root-knot nematode.

The tests employed were:

APHID FOLIAGE SPRAY TEST

*Test insect.*—Adults and nymphal stages of the bean aphid (*Aphis fabae* Scop.), reared on potted dwarf nasturtium plants at 65–70° F. and 50–70 percent relative humidity, constituted the test insects. For testing purposes, the number of aphids per pot was standardized to 100–150 by trimming plants containing excess aphids.

*Concentration of toxicant.*—The test compounds were formulated by diluting the stock suspension with water to give a suspension containing 1000 parts of test compound per million parts of final formulation (by weight).

*Application of toxicant.*—The potted plants (one pot per compound tested), infested with 100–150 aphids, were placed on a revolving turntable and sprayed with 100–110 milliliters of test compound formulation by use of a DeVilbis spray gun set at 40 p.s.i.g. air pressure. This application, which lasted 30 seconds, was sufficient to wet the plants to run-off. As a control, 100–110 milliliters of a water solution containing acetone and emulsifier in the same concentrations as the test compound formulation, but containing no test compound, were also sprayed on infested plants.

*Holding conditions.*—After spraying, the pots were placed on their sides on a sheet of white standard mimeograph paper which had been previously ruled into squares to facilitate counting. Temperature and humidity in the test room during the 24-hour holding period were 80±5° F. and 50±5 percent, respectively.

*Record of results.*—Aphids which fell onto the paper and were unable to remain standing after being uprighted were considered dead. Aphids remaining on the plants were observed closely for movement and those which were unable to move the length of their body upon stimulation by prodding were considered dead. Each compound was rated according to the following numerical designations:

5=80–100% mortality
3=40–79% mortality
1=0–39% mortality

ARMYWORM LEAF DIP TEST

*Test insect.*—Larvae of the southern armyworm (*Prodenia eridania*, Cram.), reared on Tendergreen bean plants at a temperature of 80±5° F. and a relative humidity of 50±5 percent, constituted the test insects. The test larvae were removed from the colony and held without food for four hours prior to the test.

*Concentration of toxicant.*—The test compounds were formulated by diluting the stock suspension with water to give a suspension containing 1000 parts of test compound per million parts of final formulation (by weight).

*Application of toxicant.*—Paired seed leaves, excised from Tendergreen bean plants, were dipped in the test formulations until thoroughly wetted, excess liquid being removed by gentle shaking. While the leaves were drying in a ventilated hood, wilting was prevented by placing the stems in water. When dry, the paired leaves were separated and each one was placed in a 9-centimeter Petri dish lined with filter paper. Four randomly selected larvae were introduced into each dish and the dishes were closed.

*Holding conditions.*—The closed dishes were labeled and held at 80–85° F. for three days. Although the larvae could easily consume the whole leaf within twenty-four hours, no more food was added.

*Record of results.*—Larvae which were unable to move the length of the body, even upon stimulation by prodding, were considered dead. Each compound was rated according to the following designations:

5=80–100% mortality
3=40–79% mortality
1=0–39% mortality

MEXICAN BEAN BEETLE LEAF DIP TEST

*Test insect.*—Third instar larvae of the Mexican bean betle (*Epilachna varivestis*, Muls.), reared on Tendergreen bean plants at a temperature of 80±5° F. and 50±5 percent relative humidity, were the test insects.

*Concentration of toxicants.*—The test compounds were formulated by diluting the stock suspension with water to give a suspension containing 1000 parts of test compound per million parts of final formulation by weight.

*Application of toxicant.*—Paired seed leaves excised from Tendergreen bean plants were dipped in the test formulation until thoroughly wetted, excess liquid being removed by gentle shaking. While the leaves were drying under a hood, wilting was prevented by placing the stems in water. When dry, the paired leaves were separated and each was placed in a 9-centimeter Petri dish lined with filter paper. Four randomly selected larvae were introduced into each dish, and the dishes were closed.

*Holding conditions.*—The closed dishes were labeled and held at a temperature of 80±5° F. for three days. Although the larvae could easily consume the leaf 24 to 48 hours, no more food was added.

*Record of results.*—Larvae which were unable to move the length of the body, even upon stimulation, were considered dead. Each compound was rated according to the following designations:

5=80–100% mortality
3=40–79% mortality
1=0–39% mortality

FLY BAIT TEST

*Test insect.*—4–6 day old adult house flies (*Musca domestica*, L), reared according to the specifications of the Chemical Specialties Manufacturing Association (Blue Book, MacNair-Dorland Co., N.Y., 1954: pages 243–244, 261) under controlled conditions of 80±2° F. and 50±5 percent relative humidity, were the test insects. The flies were immobilized by anestetizing with carbon dioxide and twenty-five immobilized individuals, males and females, were transferred to a cage consisting of a standard food strainer about five inches in diameter which was inverted over blotting paper.

*Concentration of toxicant.*—The test compounds were formulated by diluting the stock suspension with a 10 percent (by weight) sugar solution to give a suspension containing 1000 parts of test compound per million parts of final formulation by weight.

*Application of toxicant.*—Fifteen milliliters of the test formulation were added to a soufflé cup cointaining a one-inch square of an absorbent pad. The bait cup was introduced and centered on the blotting paper under the food strainer prior to admitting the flies.

*Holding conditions.*—The caged flies were allowed to feed on the bait for twenty-four hours, at a temperature of 80±5° F. and relative humidity of 50±5 percent.

*Record of results.*—Flies which showed no sign of movement on prodding were considered dead. Each compound was rated according to the following designations:

5=80–100% mortality
3=40–79% mortality
1=0–39% mortality

MITE FOLIAGE SPRAY TEST

*Test organism.*—Adults and nymph stages of the two-spotted mite (*Tetranychus telarium* L.), reared on Tendergreen bean plants at 80±5° F. and 50±5 percent relative humidity, were the test organisms. Infested leaves from a stock culture were placed on the primary leaves of two bean plants six to eight inches in height, growing in a two and a half inch clay pot. 150–200 mites, a sufficient number for testing, transferred from the excised leaves to the fresh plants in a period of twenty-four hours. Following the twenty-four hour transfer period, the excised leaves were removed from the infested plants.

*Concentration of toxicant.*—The test compounds were formulated by diluting the stock suspension with water to give a suspension containing 2500 parts of test compound per million parts of final formulation.

*Application of toxicant.*—The potted plants (one pot per compound) were placed on a revolving turntable and sprayed with 100–110 milliliters of test compound formulation by use of a DeVilbis spray gun set at 40 p.s.i.g. air pressure. This application, which lasted 30 seconds, was sufficient to wet the plants to run-off. As a control, 100–110 milliliters of a water solution containing acetone and emulsifer in the same concentrations as the test compound formulation, but containing no test compound, were also sprayed on infested plants.

*Holding conditions.*—The sprayed plants were held at 80±5° F. and 50±5 percent relative humidity for four days, after which a mortality count of motile forms was made.

*Record of results.*—Microscopic examination for motile forms was made on the leaves of the test plants. Any individual which was capable of locomotion upon prodding was considered living. Each compound was then rated according to the following designations.

5=80–100% mortality
3=40–79% mortality
1=0–39% mortality

NEMATOCIDE TEST

*Test organism.*—Infective migratory larvae of the root-knot nematode (*Meloidogyne incognita* var. *acrita*), reared in the greenhouse on roots of Rutgers variety tomato plants constituted the test organism. Infected tomato plants were removed from the culture and the roots were chopped very finely. A small amount of these choppings was added to a pint Mason jar contaning approximately 180 cubic centimeters of composted loam soil. The jar was capped and incubated for one week at room temperature. During the incubation period eggs of the nematode hatch and the larval forms migrate into the soil.

*Concentration of toxicant.*—The test compounds were formulated by diluting the stock suspension with water to give a suspension containing 2000 parts of test compound per million parts of final formulation.

*Application of toxicant.*—Twenty-five milliliters of the test formulation were added to each of two jars. Thus each jar contained 50 milligrams of test compound, an amount roughly equivalent to 375 pounds per acre. Following the introduction of the test formulation, the jars were capped and the contents thoroughly mixed on a ball mill for five minutes.

*Holding conditions.*—The jars remained capped at room temperature for 48 hours whereupon the contents were transferred to 3-inch pots. These pots were then seeded with melon or cucumber as an indicator crop and placed in the greenhouse where they were cared for in the usual fashion for approximately three weeks.

*Record of results.*—The melon or cucumber plants were removed from the pots and the soil was washed from the roots. The amount of galling was determined by visual inspection and rated according to the following designations:

5=no galling; perfect control
4=very light galling
3=light galling
2=moderate galling
1=severe galling, equal to untreated plants The results of the above-described tests are set forth in Table I, below.

The controls exhibited no pesticidal activity.

TABLE I

| Compound No. | Biological Evaluation | | | | | |
|---|---|---|---|---|---|---|
| | Aphid | Army Worm | Mexican Bean Beetle | Fly Bait | Mite (Motile Forms) | Root-knot Nematode |
| 1 | 5 | | | 5 | 3 | 4 |
| 2 | 5 | | | | | 3 |
| 3 | 5 | | | 3 | | 3 |
| 4 | 5 | | | | 3 | |
| 5 | 5 | | | 5 | 3 | |
| 6 | 5 | | | | | |
| 7 | 5 | | | 5 | 5 | |
| 8 | 5 | | | | 5 | |
| 9 | | | | | | 5 |
| 10 | 5 | 5 | 5 | 5 | 5 | 3 |
| 11 | | | | 3 | | |
| 12 | | | | 5 | 3 | |
| 13 | | | | 5 | | |
| 14 | 5 | 5 | 5 | 5 | 5 | |
| 15 | 3 | | 3 | 5 | 5 | 3 |
| 16 | | | | 5 | | |
| Concentration[1] | 1,000 | 1,000 | 1,000 | 1,000 | 2,500 | 2,000 |

[1] In parts of compound per million parts of final, applied formulation, by weight.

In addition to the distinctive pesticidal activity of the compounds contemplated herein, the compounds of this invention are generally useful as fungicides and bactericides and may find application as modifiers in resin manufacture and in the field of surfactants.

What is claimed is:
1. 2 - chloro - 3 - methyl - 2 - cyclohexen - 1 - one N-methylcarbamyloxime.
2. 2 - methyl - 5 - isopropenyl - 2 - cyclohexen - 1 - one N-methylcarbamyloxime.
3. 2 - chloro - 3,5,5 - trimethyl - 2 - cyclohexen - 1 - one N - methylcarbamyloxime.
4. 3,5,5 - trimethyl - 2 - cyclohexen - 1 - one N - methylcarbamyloxime.
5. 2 - chloro - 3 - isopropyl - 2 - cyclohexen - 1 - one N-methylcarbamyloxime.

References Cited by the Examiner

UNITED STATES PATENTS

| | | | |
|---|---|---|---|
| 1,733,462 | 10/1927 | Kropp. | |
| 2,435,274 | 2/1948 | Hester | 167—30 |
| 2,442,854 | 6/1948 | Leffler et al. | 260—566 |
| 2,882,318 | 4/1959 | Kundiger et al. | 260—566 |
| 2,884,336 | 4/1959 | Loshaek et al. | |
| 2,909,457 | 10/1959 | Birum | 167—30 |

FOREIGN PATENTS 229,548   7/1960   Australia.

OTHER REFERENCES

Georghiu, Bull Soc. Chim France, 4th Series, vol. 49, pp. 1205–1210 (1931).

Petersen, Ann. der chemie, vol. 562, pp. 205–229 (1949).

Zinner, C. A. vol. 53, page 13999 (1959).

CHARLES B. PARKER, *Primary Examiner.*

LEON ZITVER, JOSEPH P. BRUST, *Examiners.*

FLOYD D. HIGEL, *Assistant Examiner.*